(12) United States Patent
Fischer

(10) Patent No.: US 9,241,499 B2
(45) Date of Patent: Jan. 26, 2016

(54) METHOD AND DEVICE FOR PRODUCING A COFFEE PREPARATION

(75) Inventor: Daniel Fischer, Romanshorn (CH)

(73) Assignee: EUGSTER/FRISMAG AG, Amriswil (CH)

( * ) Notice: Subject to any disclaimer, the term of this patent is extended or adjusted under 35 U.S.C. 154(b) by 0 days.

(21) Appl. No.: 14/343,097

(22) PCT Filed: Jul. 5, 2012

(86) PCT No.: PCT/EP2012/063193
§ 371 (c)(1),
(2), (4) Date: Mar. 6, 2014

(87) PCT Pub. No.: WO2013/034334
PCT Pub. Date: Mar. 14, 2013

(65) Prior Publication Data
US 2014/0227403 A1    Aug. 14, 2014

(30) Foreign Application Priority Data
Sep. 6, 2011    (DE) .......................... 10 2011 053 294

(51) Int. Cl.
*A47J 31/40* (2006.01)
*A23F 5/26* (2006.01)
(Continued)

(52) U.S. Cl.
CPC ................. *A23F 5/267* (2013.01); *A23F 5/262* (2013.01); *A47J 31/3609* (2013.01); *A47J 31/40* (2013.01); *A47J 31/404* (2013.01); *G07F 11/44* (2013.01); *G07F 13/00* (2013.01); *G07F 13/065* (2013.01)

(58) Field of Classification Search
CPC ..... A47J 31/40; A47J 31/404; A47J 31/3609; A23F 5/262; A23F 5/267; G07F 13/00; G07F 13/065; G07F 11/44
See application file for complete search history.

(56) References Cited

U.S. PATENT DOCUMENTS 5,237,910 A * 8/1993 Chigira ........................... 99/282
6,330,850 B1 12/2001 Rosse
(Continued)

FOREIGN PATENT DOCUMENTS

DE    7042411 U    6/1971
DE    2119982 A1    11/1972
(Continued)

OTHER PUBLICATIONS

English Mechanical Translation for DE2119982 published Nov. 1972.*

*Primary Examiner* — Anthony Weier
(74) *Attorney, Agent, or Firm* — Bachman & LaPointe, P.C.

(57) ABSTRACT

A method for the automated production of a coffee preparation with a coffee preparation device (1) having a brewing unit, the method including the following steps: insertion of a pre-filled cartridge (3) with a powder supply (4) having a plurality of, preferably compressed, powder portions (11) of ground coffee beans into a cartridge receptacle (2) of a preparation device (1); automatic or at least partially manual metering of a powder portion (11) from the powder supply (4), wherein the entire powder supply (4) is moved for this purpose, preferably displaced axially, with the assistance of metering unit (10), and then the powder portion (11) is separated from the powder supply (4); transfer of the powder portion (11) to a brewing unit of a preparation device (16); automatic preparation of the coffee in the brewing unit, using the powder portion (11) and a heated, potable fluid flowing through the powder portion in the brewing unit, more particularly under pressure; closure of the cartridge (3) in the cartridge outlet opening area (5) of the preparation device.

22 Claims, 2 Drawing Sheets

(51) Int. Cl.
*G07F 11/44* (2006.01)
*G07F 13/00* (2006.01)
*G07F 13/06* (2006.01)
*A47J 31/36* (2006.01)

(56) References Cited

U.S. PATENT DOCUMENTS

| | | |
|---|---|---|
| 6,941,855 B2 | 9/2005 | Denisart et al. |
| 7,051,646 B2 | 5/2006 | Della Pietra et al. |
| 2002/0145010 A1 | 10/2002 | Ufheil et al. |
| 2004/0129145 A1 | 7/2004 | Denisart et al. |
| 2005/0000366 A9 | 1/2005 | Denisart et al. |
| 2005/0061158 A1 | 3/2005 | Della Pietra et al. |
| 2008/0245239 A1 | 10/2008 | Fischer et al. |
| 2010/0320225 A1 | 12/2010 | Kirschner |

FOREIGN PATENT DOCUMENTS

| | | |
|---|---|---|
| DE | 60107199 T2 | 11/2005 |
| DE | 60201801 T2 | 12/2005 |
| DE | 202006008409 U1 | 8/2006 |
| DE | 202008005274 U1 | 7/2008 |
| EP | 1103210 A1 | 5/2001 |
| EP | 1615004 A1 | 1/2006 |
| FR | 2937627 * | 4/2010 |
| JP | 10-211105 | 8/1998 |

* cited by examiner

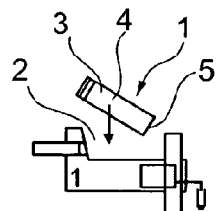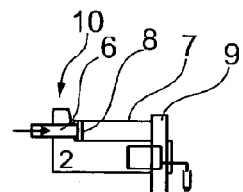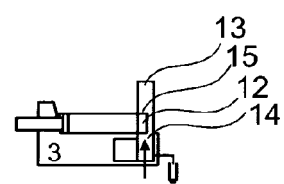
Fig. 1a  Fig. 1b  Fig. 1c
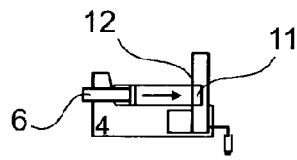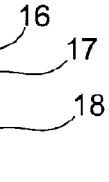
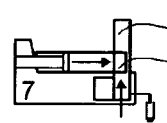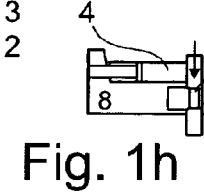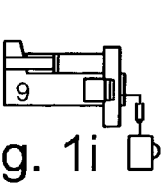
Fig. 1g  Fig. 1h  Fig. 1i
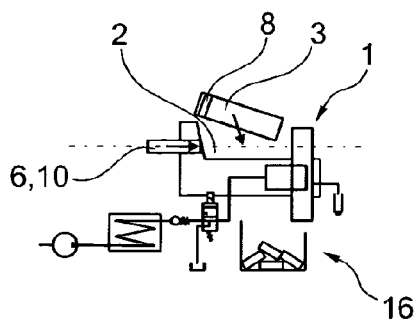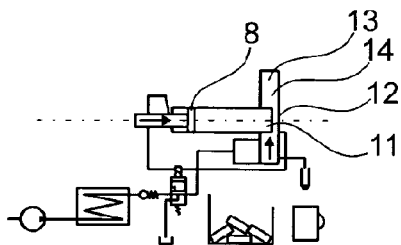
Fig. 2a  Fig. 2b
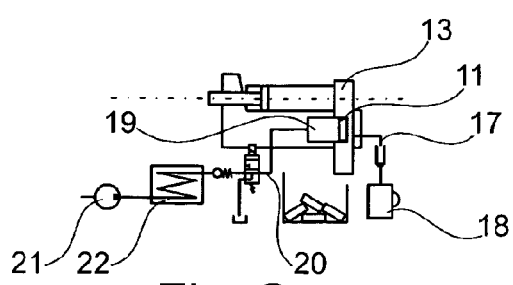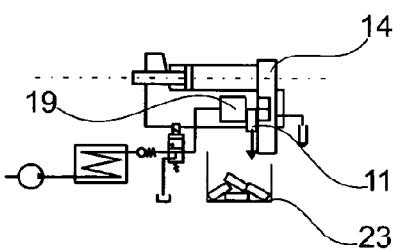
Fig. 2c  Fig. 2d

METHOD AND DEVICE FOR PRODUCING A COFFEE PREPARATION

BACKGROUND OF THE INVENTION

The invention relates to a method for producing coffee (=coffee preparation), preferably in an automated manner, using a preparation device, which comprises a brewing unit or which consists of the latter, in which hot water flows through a coffee bean powder portion and the coffee powder is retained by means of a screen, for example, as so-called grounds. The invention further relates to a coffee preparation device, in particular for carrying out the production method according to the invention. The invention further leads to a cartridge, which is filled with coffee powder consisting of ground coffee beans, as well as to the use thereof in context with the proposed method and/or of the proposed coffee preparation device.

So-called fully automatic coffee makers comprising a coffee bean container, a grinder as well as a preparation device, in which heated water is pressed through the coffee beans, which were ground beforehand in portions, to make the coffee, are known. Such fully automatic coffee makers have proved themselves and are suitable for use in the case of a high coffee consumption. In the case of fully automatic coffee makers, it is problematic that the coffee beans lose aroma because of low consumption and because they remain in the coffee bean container for a longer period of time as a result. In addition, it is disadvantageous in the case of common coffee makers that a coffee bean blend change is only possible after using up the bean quantity, which is located in the coffee bean container. An advantage of coffee makers is that they must be refilled comparatively infrequently with coffee beans. In addition, the operating costs are more cost-efficient, because coffee beans are used instead of capsules as bulk goods.

In addition to the above-mentioned fully automatic coffee makers, so-called coffee capsule machines exist, into which disposable coffee powder cartridges can be inserted, through which pressurized hot water flows in the coffee maker.

Such coffee makers have proved themselves in particular in the case of low coffee consumption and are always preferred, if there is an interest in a frequent change of blends. However, it is a disadvantage of the capsule coffee makers that a new capsule must be used for every brewing process, which is not only extensive, but in addition also generates packaging waste. It is advantageous that the powder portion, which is encapsulated in a capsule, is protected well against loss of aroma and that a change of blends can be carried out easily by manually selecting a corresponding capsule. A further advantage of capsule machines is that they are designed in a technically significantly simpler manner and can thus be embodied in a more robust manner or so as to be less susceptible to interferences, respectively. For example, the complete grinding unit as well as a coffee bean storage container can thus be foregone.

Preparation devices, which are designed specifically for an average coffee consumption, do not exist to date.

A device for automatically dissolving instant milk powder is known from DE 20 2006 008 409, wherein the device encompasses a storage container, which can be refilled manually and from which the powder falls onto a worm conveyor due to the force of gravity. By means of said worm conveyor, the powder is transported into a frothing unit, in which hot water is added to the metered powder quantity.

A device for producing beverages consisting of instant powders is known from EP 1 103 210 A1, wherein the powder must be water-soluble—the processing of coffee bean powder is not possible with the known device. The device is characterized in that it comprises a storage container, in which a plurality of sticks, in each case consisting of pressed, water-soluble instant beverage preparation powder, is accommodated. The sticks can be adjusted axially by means of a piston, to a cutting unit, by means of which individual powder portions can be separated from the stick, so as to then be dissolved in water. The advantage of the device is that beverage portions can be separated from a stick-shaped supply. However, it is disadvantageous that the sticks, which are arranged on top of one another in the storage container in an unprotected manner are still subjected to oxidation.

Based on the above-mentioned state of the art, the invention is based on the task of specifying a preparation method and a preparation device for an average consumption from a coffee preparation, which is to be prepared from ground coffee beans, as well as a cartridge, which is suitable for this purpose.

SUMMARY OF THE INVENTION

The method and the device are to combine as many advantages of coffee makers on the one hand and of capsule coffee makers on the other hand and are to reduce the respective disadvantages thereof with regard to an average consumption, if possible. The aroma of the base preparation material, in particular of the ground coffee, is to thus be maintained for a longer period of time in response to an average consumption, wherein, simultaneously, a refilling of base preparation material is to not be necessary after each preparation, as is the case with the current capsule machines. In addition, a suitable protective capsule (cartridge) is to be specified for the powder consisting of ground coffee beans.

Instead of using a currently known cartridge, which contains a single coffee bean powder portion (which remains after the brewing process), which must be used completely in response to a brewing process, the invention is based on the idea of using a cartridge, which is preferably embodied as disposable cartridge, which is prefilled with a coffee bean powder supply, which is preferably compressed, wherein this powder supply is sufficient for a plurality of, that is, for at least two, preferably for more than two preparation cycles. In other words, the powder supply, which is preferably present in one piece, that is, not in compartments, which are separated from one another, comprises a plurality of powder portions, which can be metered out or separated, respectively, from the powder supply. In particular, the cartridge comprises a single powder stick, which is protected from environmental influences, in particular an oxygen and/or moisture contact, by means of the cartridge.

According to the invention, the powder portion, which is metered, that is, separated from the coffee bean powder supply, is not brewed in the capsule or through the capsule, respectively, as is the case with known capsule machines, but is transferred into an automatic preparation device, in which the coffee is created, in that water, which is heated with the help of heating means, is added to the powder portion and is conveyed, in particular pressed, through the powder portion, wherein the leached powder portion remains as grounds and is preferably ejected manually or automatically. Provision is preferably made for a pump for conveying the liquid.

When processing the coffee powder portion in the preparation device, more accurately in a brewing unit of the preparation mechanism, the water, which is preferably pressurized, is pressed through the powder portion, wherein the powder portion (then grounds) is held back upstream of an outlet, in particular by means of a filter or screen.

According to the invention, the entire powder supply is moved, that is, displaced in particular relative to the cartridge, preferably relative to the shearing means of the metering means, which will be explained below, by means of which the coffee portion is separated from the powder supply, for metering the coffee powder portion from the cartridge. As will also be explained below, there are on principle two different displacing or feeding possibilities, respectively, for shifting the entire powder supply. According to a first preferred alternative, the powder supply is displaced relative to the preferably fixed cartridge, for example in that a compression die of the metering means engages with the cartridge and displaces the powder supply in the cartridge in the direction of an outlet opening or beyond the latter, respectively, wherein the excess end can then be separated as coffee portion or only a portion of the excess end. The compression die can be driven automatically, for example by means of an electric motor, and/or manually, for example by means of a hand lever, the displacement movement of which is converted into a feed motion of the compression die. In the case of proceeding in an alternative manner, the entire powder supply is displaced automatically or manually, together with the cartridge, preferably relative to a cartridge accommodation, and a separation of the powder portion preferably takes place with the help of a blade, for example, or a shearing means, which comprises a powder portion recess, together with a cartridge section, which surrounds the powder portion.

Metering the powder portion from the cartridge or from the powder supply, which comprises a plurality of powder portions, respectively, thereby preferably takes place by applying pressure indirectly to said powder supply in that pressure is applied to the cartridge with the help of metering means, which will be explained below, so as to displace or to deform a cartridge section, for example, in particular a cartridge bottom, or in that a cartridge section comprising the entire powder portion contained therein is separated.

According to the invention, provision is made for the preparation device to be embodied such that the cartridge can be sealed therein. In other words, provision is made for sealing means for automatically or manually sealing the cartridge, preferably in an at least approximately aroma-right manner, in particular an outlet opening (metering opening) of the cartridge, preferably after a metering, that is, after removing a powder portion, and to thus ensure a long shelf-life or to considerably slow down oxidation processes.

Different possibilities exist with regard to the point in time when the cartridge is closed at least partially, preferably completely. It is particularly preferred, if, as will be explained below, sealing is carried out automatically with the help of the shearing means and/or with the help of optionally provided transport means, during the metering process, in particular the shearing process. It is also possible for provision to be made for sealing means, which are different from this. On principle, it is possible for the cartridge to be sealed during the metering, that is, during the separation or the shearing of the powder portion from the powder supply, respectively, or thereafter, for example prior to transferring the powder portion to a preparation mechanism, and/or during the transfer of the powder portion to the preparation device and/or after the transfer. It is also possible for the sealing to only take place while heated water flows or after heated water has flown through the powder portion within the brewing unit (brewing process).

In the simplest case, the sealing means, which comprise elastomer sealing means, if applicable, seal a cartridge opening, for example by means of a slide-like component, wherein it is even more preferably, if a sealing direction or displacement direction, respectively, of the sealing means runs vertically to a metering direction. It is particularly preferred for the preparation device to be designed such that the cartridge is sealed in the preparation device after removing a powder portion and remains sealed until a further powder portion is to be removed from the powder supply of the cartridge. It is particularly preferred for the outlet opening to be opened, in particular manually or automatically, prior to metering a coffee powder portion in the coffee preparation device.

Compared to the known preparation concepts, the method according to the invention and the preparation device according to the invention have considerable advantages. Due to the encapsulation of the powder supply, the aroma can thus be preserved for a comparatively long period of time. In addition, the device can be designed so as to be comparatively simple, because a grinder can be foregone. In addition, the cartridge does not need be changed after every preparation process, as in the case of the known capsule machines, but a plurality of powder portions can be separated subsequently from the same cartridge or from the same powder supply, respectively, and can be transferred into the preparation mechanism for preparation purposes.

Not only the handling of a device according to the invention or carrying out a method according to the invention, respectively, becomes comfortable through this, but the created waste is also reduced. The cartridge, which is used, is preferably aroma-tight and comprises an aroma seal, which is removed prior to insertion into a cartridge accommodation of the preparation mechanism. It is also possible for a seal, which is formed by a cartridge section, to be removed automatically after inserting into the preparation device, for example by means of separation. The cartridges, which are used, are clean and handy containers, wherein the product (powder supply) can be sealed until the last portion is used.

Moisture absorption can also be prevented. The device or the method, respectively, is mainly suitable for use in the office and small catering sector, where average quantities of beverages or quantities of soups are consumed. Hot chocolate powder, milk powder, ground coffee or tea leaves, for example, which are stored in (aroma) cartridges, for example, can thus be processed or prepared, respectively, as beverages by means of the method and the device. The preparation of soups is also possible in a simple manner by means of the method or the device, respectively.

Various possibilities exist with regard to the concrete design of the cartridge, which is used. It is particularly preferred, if the cartridge comprises a metal sleeve, in particular made of a light metal alloy, preferably of an aluminum alloy. In addition or in the alternative, provision can also be made for a plastic sleeve, preferably made of comparatively rigid plastic. As a whole, it is advantageous, if the cartridge encompasses the shape of a tube or stick, respectively, and directly delimits or encloses, respectively, a stick-shaped powder supply.

It is also possible for the cartridge to encompass a film-like skin, preferably so as to separate a powder portion along with the film section and so as to be able to transfer it into the preparation mechanism. It is also possible for the sleeve to consist of a food-compatible lacquer coat, by means of which the powder, which is preferably compressed, is enclosed. Preferably, the cartridge is at least approximately aroma-tight or comprises or consists of, respectively, a barrier layer against moisture, in particular water vapor and gases, preferably oxygen.

As explained, the cartridge, which is used, comprises a plurality of powder portions, that is, a powder portion can be metered repeatedly from the powder supply, which comprises a plurality of powder portions, wherein one powder portion preferably suffices to produce one or maximally two beverage portions or soup portions, thus for producing one or maximally two cups in the case of coffee. In the event that coffee powder is used as powder, for example, it turned out to be advantageous, if a powder portion for the production of one cup weighs between approximately 7 g and 14 g or approximately 14 g and 28 g for the case that one powder portion is to be sufficient for filling two cups of coffee. It is particularly preferred, if at least 30 g of powder, preferably at least 50 g of powder, more preferably between approximately 40 g and 150 g of powder is accommodated in the cartridge, more preferably in the compressed state.

An embodiment of the method or of the coffee preparation device, receptively, in the case of which the powder supply, which remains or which is located in the capsule, respectively, is closed on all sides or is delimited on all sides, respectively, or rests against the cartridge walls and/or sealing means, is particularly preferred. It is achieved through this that the cartridge volume is free from larger gas quantities or free from empty spaces, respectively, at any time. In a further development of the invention, provision is thus made for adapting the capsule volume, which surrounds the powder supply, to the quantity of powder supply or to reduce it accordingly, respectively, as the powder supply decreases, in particular during or by metering the powder portion. For example, this can be achieved in that a die and/or cartridge bottom is displaced in the cartridge for metering a powder portion, wherein the removed powder portion volume is compensated by the displacement travel. It is particularly advantageous, if the powder portion is separated from the remaining powder supply, in particular cut off or sheared off, respectively, in one powder portion piece. The oxygen contact in particular to the remaining powder supply is minimized considerably through this.

A significant advantage of the method according to the invention or of the preparation device according to the invention, respectively, can be realized in that the size of a powder portion, which is to be removed, that is, the weight and/or volume thereof, can be changed or adjusted, respectively, so as to thus be able to adapt the concentration (strength) of the coffee to individual demands of different users. When providing a die for metering, the powder quantity, which is to be removed, can be adjusted by changing the die feed travel. It is possible to adjust the powder quantity, which is to be removed, continuously or in several stages, in particular by correspondingly activating a drive motor, which is preferably embodied as step motor, or by manually or automatically displacing an optional stop for the die. This can be carried out manually by the user, or automatically, for example, by the preparation device, in that the latter recognizes the powder type or capsule type, respectively, and adjusts the desired powder quantity of a powder portion according to defaults.

As already suggested, a preferred possibility of embodying the metering means is for the latter to comprise a compression die. There are different possibilities with regard to how the compression die interacts with the powder supply or with the cartridge, respectively. Preferably, the compression die is used such that the powder portion is pushed or pressed out of the cartridge, respectively, directly by means of said compression die. This can take place by means of a deformation of the cartridge and/or by displacing the compression die into the cartridge, preferably from an end, which faces away from an outlet opening (metering opening). The compression die can thereby either form a cartridge bottom and can thus come into direct contact with the powder supply, or can displace a cartridge section, in particular a cartridge bottom, of a preferably cylindrical cartridge, preferably in such a manner that said bottom or the die remains in constant contact with the remaining powder supply, so as to ensure the exclusion of air in the cartridge.

It is also possible for the compression die to be used to shift the entire cartridge, that is, not only the powder supply, preferably relative to a cartridge accommodation of the device, preferably in the direction of shearing means, which will be explained below, by means of which the powder portion, which is to be metered, is then preferably separated along with a cartridge section.

As already explained above, it is advantageous, if the metering means comprise shearing means for shearing off a powder portion from the powder supply. An embodiment, in the case of which the shearing means are simultaneously transport means for transporting the powder portion, is thereby possible. In this case, it is advantageous, if the shearing means comprise a recess, in which a powder portion is inserted by means of a compression die, for example, and which is then separated by adjusting the shearing means relative to the cartridge accommodation, preferably in one piece. Likewise, it is possible for the shearing means to be embodied as a type of blade, so as to separate a powder section (powder portion), which was pressed out of the cartridge. Likewise, it is possible for the powder portion, which is to be separated, to be separated along with a cartridge section, which surrounds said powder portion. In the latter case, it is possible to transfer the powder portion into the preparation mechanism together with the separated cartridge section, or to separate the cartridge section automatically beforehand.

As explained above, it is preferred, if the cartridge, in particular a cartridge opening, is sealed after removing a powder portion. The shearing means or a section of the shearing means, respectively, or a sealing part, which is operatively connected to the shearing means, in particular a mechanically coupled sealing part, can serve as sealing means for this purpose.

It is also possible that transport means serve as sealing means to transfer or transport, respectively, the powder portion in the direction of the preparation mechanism, in particular into the preparation mechanism, wherein it is particularly preferred, if these transport means are preferably formed by shearing means, which encompass a recess, for separating the powder portion.

To increase the selection of different blends of coffee for the user of a preparation device according to the invention, provision is made in a further development of the method and of the device for the preparation device to encompass a plurality of cartridge accommodations for at least one cartridge in each case and, prior to removing a powder portion, for one of the cartridges to be capable of being selected in particular by means of a corresponding electronic menu navigation, from which the powder portion is then removed with the help of metering means.

It is particularly preferred, if milk powder and/or cocoa powder (chocolate powder) is used in addition to the ground coffee bean powder, which is to be processed in a brewing unit, to prepare the coffee (coffee preparation), for example for preparing a cappuccino or chococcino or the like. Analogous to the ground coffee powder, the corresponding powder (milk powder or chocolate powder), which is preferably water-soluble, is preferably located in a cartridge, which comprises a plurality of portions of the respective powder and which is preferably designed like a coffee powder cartridge, as described above. According to the further development, provision is accordingly made in the preparation device for at least one corresponding (further) cartridge accommodation and for metering means for metering a powder portion from the powder supply of the cartridge, wherein it is also preferably ensured herein that the corresponding cartridge is sealed suitably, for example by means of shearing means and/or transport means or separate sealing means at a point in time after the metering. In the event that milk powder is used, hot water and/or water vapor is preferably added thereto, in particular in a milk frothing chamber, which is known per se. Cocoa powder can also be added to heated water and/or can be added directly to heated milk and/or to the coffee product from the brewing chamber.

It is particularly preferred, if shearing means and sealing means and/or transport means are formed by the same displaceable component, in particular a slide.

To optimally protect the ground coffee bean powder supply in the cartridge, it is preferred, if the device encompasses inert gas means, by means of which the cartridge can be stored in the device under an inert gas atmosphere, for example a nitrogen atmosphere. For this purpose, inert gas can preferably be supplied automatically to the cartridge, for example from a pressure cylinder. In addition or in the alternative, cooling means can be provided for cooling the cartridge, because oxidation processes run more slowly in response to lower temperatures and the aroma, in particular a coffee aroma, is lost more slowly.

The invention also leads to a cartridge, which is filled with a plurality of ground coffee bean powder portions, as well as to the use thereof for carrying out a method according to the invention and/or for use in a coffee preparation mechanism according to the invention. With regard to possible designs of the cartridge, reference is made to the above disclosure. It is particularly preferred, if the cartridge comprises a sleeve made of plastic and/or metal. Preferably, the cartridge is embodied in an elongated and tube-shaped manner. It is particularly preferred for the cartridge to provide the insertion of a die, which either comes into direct contact with the powder supply in the cartridge, or which is preferably separated therefrom via a displaceable cartridge bottom.

BRIEF DESCRIPTION OF THE DRAWINGS

Further advantages, features and details of the invention follow from the description below of preferred exemplary embodiments as well as from the figures.

FIGS. 1a, 1b, 1c, 1d, 1e, 1f, 1g, 1h, and 1i show a first method alternative in detailed, subsequent sequences, using a preparation device, in the case of which a powder portion is transferred in one piece into a preparation mechanism of the preparation device with the help of combined shearing and transport means, FIGS. 2a, 2b, 2c, and 2d show a second method alternative, in the case of which water presses through the separated coffee portion under pressure in the preparation mechanism and the powder portion is retained upstream of an outlet.

The same elements and elements comprising the same function are identified with the same reference numerals in the figures.

DETAILED DESCRIPTION

Figure 3A:
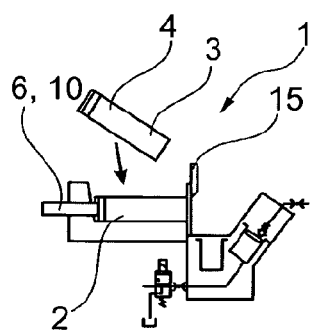
FIGS. 3a, 3b, 3c, 3d, and 3e shows a third possible method alternative, in the case of which a coffee portion is separated in one piece with the help of shearing means and then drops into an accommodating container of the preparation mechanism due to the force of gravity.

A first method alternative, which can be carried out by using a coffee preparation device, will be explained below by means of FIG. 1a to 1i. For the sake of clarity, the illustration of a heating device, which is known per se, for heating the liquid, in particular water, which is to be conveyed into a preparation mechanism of the preparation device, which comprises a brewing chamber, was forgone.

As follows from FIG. 1, the preparation device 1, which is used, comprises a cartridge accommodation 2 for accommodating a cartridge 3, which is embodied herein as disposable cartridge and which is prefilled with a compressed ground coffee bean powder supply 4, which is dimensioned such that a plurality of powder portions can be removed or metered therefrom subsequently, respectively, and can be processed into coffee (e.g. espresso, normal coffee, latte, cappuccino or the like).

In the first method step, which is shown in FIG. 1a, the filled cartridge 3, which is embodied as cylindrical aluminum cartridge or as plastic cartridge, for example, in particular of PP or PC, is inserted into the cartridge accommodation 2, preferably after removing a non-illustrated aroma seal from an outlet opening 5 of the end side of the cartridge 3.

A compression plunger 6 then moves against a bottom 8, which can be displaced in a cartridge jacket 7, from a side, which faces away from the outlet opening 5, preferably by means of a non-illustrated electric motor or, in the alternative, manually, for example driven by means of a hand lever. It can be seen in FIG. 1d that the outlet opening 5 is sealed with the help of sealing means 9, which are embodied as slide. Preferably, the compression plunger 6, which is a component of metering means 10, is moved into the cartridge 3 to the extent that the entire powder supply 4 is pressed against the sealing means 9.

The actual metering step begins in the method step illustrated in FIG. 1c, in the case of which a powder portion 11, which is shown in FIGS. 1d and 1e, for example, is separated from the powder supply in one piece. For this purpose, the sealing means 9 are initially moved vertically to the direction of movement of the compression plunger 6, such that a recess 12 (powder portion accommodation) is aligned with the outlet opening 5 of the cartridge 3. The recess 12 is located in the slide 13, which simultaneously forms transport means 14 for transferring the powder portion into a preparation mechanism. At the same time, the slide 13 forms the sealing means 9.

In addition, shearing means 15 are formed by the slide 13, which, as will be explained below, separate the powder portion in one piece from the powder supply 4.

It can be seen in FIG. 1d that the compression plunger 6 of the metering means 10 is moved further into the cartridge 3 in axial direction, after the recess 12 has been aligned with the outlet opening 5, wherein the displacement path is proportional to the powder portion size or the powder quantity, respectively, which is displaced in one piece herein into the recess 12 of the slide 13 or of the transport means 14, respectively. This quantity can preferably be adjusted, wherein a drive of the compression die is activated according to the specification.

After the desired powder portion 11 has arrived in the recess 12, the feed movement of the compression plunger 6 is stopped and the shearing means 15 in the form of the slide 13 comprising a recess is moved downwards in drawing plane. The function of the shearing means 15 comprising the recess 12 as transport means 14 becomes clear herein. It also becomes clear that, with a section, which is located adjacent to the recess 12, the slide 13 forms the sealing means 9, by means of which the outlet opening 5 is sealed automatically after removing the powder portion 11.

In the case of the illustrated exemplary embodiment, the powder, which is located in the cartridge 3, is a ground product (milled product) of highly-roasted coffee beans. Previously heated hot water is pressed through said powder in the preparation mechanism 16, more exactly a brewing chamber 5 of a brewing unit, which is located below the cartridge accommodation 2. Colorings and flavorings of the coffee powder are thereby dissolved and, with the hot water, reach through an outlet channel into a container 18 for consumption purposes. Coffee grounds remain.

FIGS. 1g to 1i now illustrate a further preparation step or metering step in a shortened manner. After completing the food preparation, the preparation mechanism 16, the part of which is formed by the recess 12 herein, is emptied (not illustrated) and is aligned again in FIG. 1g with the outlet opening 5. The compression plunger 6 is further moved into the cartridge 3, whereby pressure is applied to the powder supply or a powder portion 11 is transported into the recess 12, respectively, which is then separated from the remaining powder supply 4 with the help of the slide 13 (shearing means 15) and is transported into the preparation mechanism 16 with the help of the transport means 14. In FIG. 1i, hot water is added again at that location, wherein the illustration of a pump for conveying the hot water as well as the illustration of a heating device was forgone for the sake of clarity.

A further possible preparation method will now be explained by means of FIGS. 2a to 2d.

It can be seen in FIG. 2a that a filled cartridge 3 is initially inserted into a cartridge accommodation 2, wherein a compression plunger 6 of the metering means 10 then pretensions the cartridge 3, in that the compression plunger 6 is pressed against the displaceable bottom 8.

The recess 12 of the combined shearing and transport means 13, 14, which are embodied as slide 13, is filled by feeding the compression plunger 6 with the powder portion 11, which is to be removed in one piece, and is then displaced into the preparation mechanism. The latter thereby comprises a brewing element 19, which can be adjusted vertically to the slide 13 and by means of which a brewing chamber, which is embodied by the recess 12, can be opened and sealed. Brewing element 19 and brewing chamber form a brewing unit of the preparation mechanism. A hot water line 20 for supplying hot water into the preparation mechanism 16 leads to the brewing element 19. To produce the hot water, cold water is conveyed through a heating device 22 from a non-illustrated water container or from a fresh water connection by means of a feed pump 21, wherein the pump can be forgone, if necessary, in the event that a fresh water connection is provided.

As follows from FIG. 2c, the powder portion 11 is thus conveyed into the preparation mechanism 16, wherein the brewing chamber, which is formed by the recess 12 in the shown exemplary embodiment, is sealed by means of the brewing element (sealing element). Hot water is pressed under pressure through the hot water line 20 into the recess 12, through the powder portion 11 into an outlet channel 17, and then flows into a (consumption) container 18 after absorbing aromas and other dissolvable components thereof. In the recess 12 or in the preparation mechanism 16, respectively, the powder portion 11 is held back by means of a non-illustrated, preferably metallic screen/filter in an area between recess 12 and outlet channel 17.

After the brewing process has ended, the brewing chamber is opened in that the brewing element 19 is distributed, namely vertically to the displacement direction of the transport means 14. The powder portion, which has been converted into a portion of grounds, is thereby pushed out and falls into a grounds container 23.

A further method alternative will now be described by means of FIGS. 3a to 3c.

Initially, a cartridge 3, which is filled with a powder supply 4, is inserted into a cartridge accommodation 2 and a compression plunger 6 of the metering means 10 is then moved into the cartridge 3.

It can be seen that the shearing means 15, which are formed by a blade/wedge, are not also transport means. The shearing means 15 cut (shear) the desired powder portion by means of a compression die after the entire powder supply 4 has been pushed forward and thereby seal the outlet opening 5 of the cartridge. Preferably, the blade is only pushed away from the outlet opening 5 again, when a new metering process begins.

An accommodating container 24 of the preparation mechanism 16, which can be embodied in the manner of a brewing unit of fully automatic coffee makers, which is known per se, is located in an area below the outlet opening 5 of the cartridge or below the blade 15 (shearing means), respectively. The powder portion 11, which fell into the accommodating container 24, is transported automatically to a filter 25 by means of the accommodating container 24 and embodies a brewing chamber therewith, which is sealed by the filter 25 at the end side. As follows from FIG. 3e, hot water is then pressed through a hot water line 20 through the powder portion in the accommodating container 24 and flows through the outlet channel 17 with dissolved elements of the powder portion into a container 18, here a cup.

For the sake of clarity, a heating device as well as a pump is not illustrated. It can be seen in FIG. 3e, thus after the metering or during the preparation, respectively, of a beverage in the preparation mechanism 16 (until the next metering process) that the cartridge 3 is sealed completely by means of the sealing means 9, which are formed by the shearing means 15.

Figure 3B:
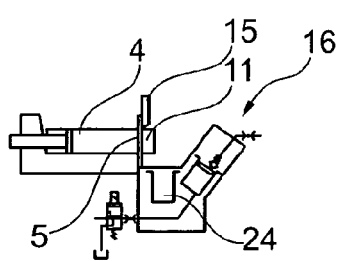
Figure 3C:
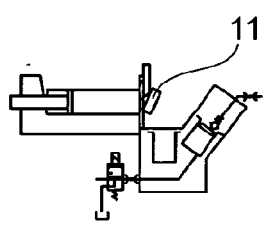
Figure 3D:
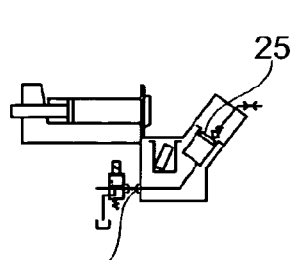
Figure 3E:
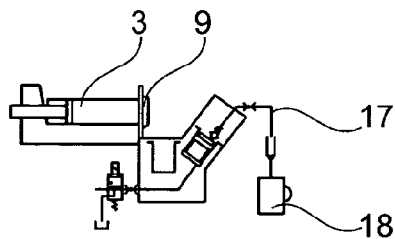

For example, the exemplary embodiment shown in FIGS. 3a to 3c can be modified such that not the entire powder supply 4 is displaced relative to the cartridge 3 by means of the compression plunger 6, but that the compression die displaces the entire cartridge 3 and that the corresponding powder portion comprising the cartridge section, which is located around it, is separated by means of the shearing means 15, wherein the cartridge section then also preferably remains in the preparation mechanism 16, here the accommodating container 24, during the brewing process.

The invention claimed is:

1. A method for automatically producing a coffee preparation by means of a coffee preparation device (1), which comprises a brewing unit, comprising the following steps:
   (a) inserting a cartridge (3), which is prefilled with a powder supply (4) of ground coffee beans, which is compressed and which comprises a plurality of powder portions (11), into a cartridge accommodation (2) of a preparation device (1);
   (b) metering of a powder portion (11) from the powder supply (4), wherein the entire powder supply (4) is displaced for this purpose, axially displaced, with the help of metering means (10), and the powder portion (11) is then separated from the powder supply (4), the metering means (10) comprise an automatically drivable compression plunger (6), which is moved for metering the powder portion in the cartridge (3) and which thereby presses on one of (a) directly on the powder supply (4), (b) directly on a deformable or displaceable cartridge section, and (c) to displace the entire cartridge (3);
   (c) transferring the powder portion (11) to a brewing unit of a preparation mechanism (16);

(d) automatic preparation of the coffee in the brewing unit using the powder portion (11) and a heated, drinkable liquid, which flows through the powder portion in the brewing unit under pressure;

(e) sealing the cartridge (3) in the area of an outlet opening (5) of the cartridge in the preparation device.

2. The method according to claim 1, wherein the cartridge (3) is sealed with the help of sealing means (9) after removing the powder portion (11).

3. The method according to claim 1, wherein a capsule volume, which surrounds the powder supply (4), is changed by and/or in response to the metering of the powder portion (11) such that the capsule volume, after removing the powder portion (11) at least approximately corresponds to the powder supply (4), which remains in the capsule, reduced by the removed powder portion (11).

4. The method according to claim 1, wherein the powder portions (11) are separated in one piece from the powder supply (4) and/or are transferred to the preparation mechanism (16).

5. The method according to claim 1, wherein the powder quantity of the powder portion (11), which is to be removed, can be adjusted.

6. The method according to claim 1, wherein the metering means (3) comprise shearing means for separating from the powder supply (4) by applying pressure for a powder portion (11) to be metered.

7. The method according to claim 6, wherein the powder portion (4) is supplied to the preparation mechanism (16) together with the cartridge.

8. The method according to claim 7, wherein the cartridge (3) is sealed by means of the shearing means (15) or by means of a sealing part, which is operatively connected to the shearing means (15).

9. The method according to claim 6, wherein the powder portion (11) is transported in the direction towards the preparation mechanism (16) with the help of transport means (14), which comprises the shearing means (15).

10. The method according to claim 9, wherein the cartridge (3) is sealed with the help of the transport means (14) or by means of a sealing part.

11. The method according to claim 1, wherein, prior to removing the powder portion (11), one of a plurality of cartridges (3), which are accommodated in a preparation device (1), is selected, from which the powder portion (11) is then removed.

12. The method according to claim 1, wherein, prior to removing a first powder portion (11), an aroma seal is removed.

13. The method according to claim 1, wherein the cartridge (3) is stored and cooled under an inert gas atmosphere.

14. The method according to claim 1, wherein at least one further powder portion (11) from the same powder supply (4) is metered in the preparation device (1) and is processed in the preparation mechanism (16) for food preparation.

15. The method according to claim 1, wherein, for preparing the coffee, a milk powder portion is metered from a milk powder cartridge, which is prefilled with a milk powder supply, which is compressed and which comprises a plurality of milk powder portions, and is mixed with water and/or water vapor, and is heated and/or frothed, and/or that a portion of cacao from a cacao powder cartridge, which is prefilled with a cocoa supply, which is compressed and which comprises a plurality of cocoa powder portions, is metered for preparing the coffee.

16. A coffee preparation device (1) for the automatic production of a coffee, comprising a cartridge accommodation (2) for a cartridge (3), which is prefilled with a powder supply (4) of ground coffee beans, and which comprises a plurality of powder portions (11), metering means (10) for metering a powder portion (11) from the powder supply (4) by displacing the entire powder supply (4) with the or relative to the cartridge (3) and separating the powder portion (11) from the powder supply (4), a heating device for heating at least one drinkable liquid, a preparation mechanism (16), which comprises a brewing unit and which is embodied for preparing the coffee using the powder portion (11) and the heated liquid, as well as sealing means (9) for sealing the cartridge (3), in the area of a cartridge outlet opening (5), wherein the metering means (10) comprise an automatically drivable compression plunger (6), which is adapted to move relative to the sealing means so as to do one of (a) insert into the cartridge (3), (b) displace the cartridge, and (c) deform a cartridge section.

17. The device according to claim 16, wherein the metering means (10) are embodied such that a cartridge volume, which surrounds the powder supply (4), is changed by means of said metering means, in response to the metering of the powder portion (11) such that, after removing the powder portion (4), the cartridge volume corresponds at least approximately to the powder portion (11), which remains in the cartridge (3), reduced by the removed powder portion (4).

18. The device according to claim 16, including means for adjusting the powder quantity of the powder portion (11), which is metered by means of the metering means (10).

19. The device according to claim 16, wherein the metering means (10) comprise shearing means (15) for metering the powder portion (11), separated from the powder supply (4).

20. The device according to claim 16, including transport means (14) formed by shearing means (15) by means of which a powder portion (11) which is metered from the cartridge (3) is transported in the direction of the preparation mechanism (16).

21. The device according to claim 16, wherein sealing means (9) are provided for sealing the cartridge (3) after metering the powder portion.

22. The device according to claim 16, wherein the powder portion (11) is dissolved in the hot liquid in the preparation unit and the hot preparation liquid is conveyed through the powder portion (11) in a brewing unit of the preparation unit under pressure.

* * * * *